(12) United States Patent
Sumetzberger (10) Patent No.: US 6,702,150 B2
(45) Date of Patent: Mar. 9, 2004

(54) HIGH-SECURITY TERMINAL FOR PNEUMATIC-TUBE CONVEYOR

(76) Inventor: Gerhard Sumetzberger, Leberstrasse 108, A-1110 Wien (AT)

( * ) Notice: Subject to any disclaimer, the term of this patent is extended or adjusted under 35 U.S.C. 154(b) by 0 days.

(21) Appl. No.: 10/091,121

(22) Filed: Mar. 5, 2002

(65) Prior Publication Data

US 2002/0140223 A1 Oct. 3, 2002

(30) Foreign Application Priority Data

Mar. 6, 2001 (AT) .......................................... A346/2001

(51) Int. Cl.[7] .............................................. B65B 59/00
(52) U.S. Cl. ...................................... 221/265; 221/277
(58) Field of Search .............................. 221/265, 264, 221/266, 277, 119, 121, 203

(56) References Cited

U.S. PATENT DOCUMENTS 5,014,877 A * 5/1991 Roos ........................ 221/265
6,394,308 B1 * 5/2002 Yuyama et al. ............. 221/265

FOREIGN PATENT DOCUMENTS

| AT | 395 310 | 11/1992 |
|----|---------|---------|
| DE | 37 09 319 | 10/1988 |
| DE | 38 01 558 | 8/1989 |

* cited by examiner

Primary Examiner—Kenneth W. Noland
(74) Attorney, Agent, or Firm—Herbert Dubno; Andrew Wilford (57) ABSTRACT

A terminal for connection between sections of a pneumatic tube has upper and lower end walls having respective ports connected to tube sections. The lower end wall also has offset from the respective tube section an outlet port. A rotor pivotal between the end walls between a pass-through position and an intercept position has a pass-through tube aligned between the tube sections only in the pass-through position and an intercept tube aligned between the tube sections only in the intercept position and aligned with the outlet port in the pass-through position. A closing plate between the rotor and the lower wall has an axially through-going aperture and is displaceable between a closed position blocking the outlet port and with the aperture over and permitting movement through the lower port and an open position with the aperture over and permitting passage through both the lower and outlet ports.

5 Claims, 7 Drawing Sheets

HIGH-SECURITY TERMINAL FOR PNEUMATIC-TUBE CONVEYOR

FIELD OF THE INVENTION

The present invention relates to a pneumatic-tube conveyor system. More particularly this invention concerns a terminal for such a system.

BACKGROUND OF THE INVENTION

A standard pneumatic-tube conveyor comprises a tube along which carriers are moved by pneumatic pressure. Along the tube there are various stations or terminals where a carrier moving along the tube can be diverted and taken out of the system and where a carrier can be introduced into the system. The systems are often set up as endless loops such that a carrier will eventually pass every terminal in the system, no matter where it is introduced. Such systems are typically used for moving small objects and papers over substantial distances, for instance in a large retail or warehouse operation. Such a system is described in German patent document 3,801,558 of J. Walther and 3,709,319 of H. Storzer.

In the most sophisticated systems each carrier has a unique identity carried in a radio-frequency transponder that can be read as the carrier moves along the tube, and simpler systems use bar codes to the same effect. Each terminal furthermore has its own station code and all the stations are connected to a computer system so that when a carrier is filled at one station it is only introduced into the tube system and sent on its way once the carrier's identity has been passed to the station to receive it so that it will know to divert the carrier as it passes.

Such a conveyor is particularly effective in a hospital or the like for delivering drug orders from a centralized pharmacy to the wards. The drugs are loaded at a secure location by the pharmacy into the conveyor and the terminal they are addressed to diverts them when they pass and holds them for dispensing in the ward.

The main problem with this system is that anyone who has access to the remote terminal can get at the drugs delivered to it. Typically the standard passage terminal just dumps the carriers it receives in a basket accessible to anyone at the location.

Thus Austrian patent 395,310 describes a system where a second rotor is provided so that the intercepted carrier is held in the terminal until it is opened and retrieved by someone authorized to open the terminal. The problem with this arrangement is that it takes the terminal out of service while it is holding a carrier, that is it cannot be used for dispatching or intercepting a carrier and in fact the terminal is blocked while it is holding a carrier for retrieval by an authorized user. This makes the system unusable in a large-scale operation with substantial carrier traffic, as the system is largely down until a carrier is retrieved from a locked terminal.

OBJECTS OF THE INVENTION

It is therefore an object of the present invention to provide an improved terminal for a pneumatic-tube conveyor.

Another object is the provision of such an improved terminal for a pneumatic-tube conveyor which overcomes the above-given disadvantages, that is which will not allow unauthorized persons access to received carriers.

SUMMARY OF THE INVENTION

A terminal for connection between sections of a pneumatic tube for passing and intercepting carriers passing along the tube has according to the invention upper and lower end walls spaced apart along an axis and having respective upper and lower ports respectively connected to the tube sections. The lower end wall also has angularly offset from the respective tube section an outlet port. A rotor rotatable about the axis between the end walls between a pass-through position and an intercept position has a pass-through tube aligned between the tube sections only in the pass-through position and an intercept tube aligned between the tube sections only in the intercept position and aligned with the outlet port in the pass-through position. The intercept tube is adapted to brake and stop a carrier. A closing plate between the rotor and the lower wall has an axially throughgoing aperture and is displaceable between a closed position blocking the outlet port and with the aperture over and permitting movement through the lower port and an open position with the aperture over and permitting passage through both the lower and outlet ports. A user-specific lock can displace the closing plate into the open position.

Thus with this arrangement the terminal remains open and can still pass carriers even when it is securely holding a carrier for pickup. According to the invention a second rotor separate from the first-mentioned rotor is rotatable about the axis between the end walls between a loading position and a dispatch position. The second rotor has a loading tube with a lateral loading opening and aligned with the tube sections in the dispatch position and not aligned with the tube sections in the loading position. This second rotor can therefore be used to send back or dispatch a carrier even when the terminal is in secure mode holding a carrier for pickup, in which case of course the first rotor is movable into a position with both its tubes out of alignment with the upper and lower tube sections.

The plate is rotatable about the axis between the closed and open positions. In this case its aperture is angularly elongated. It is also possible for the closing plate to be slidable generally radially of the axis between the closed and open positions.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
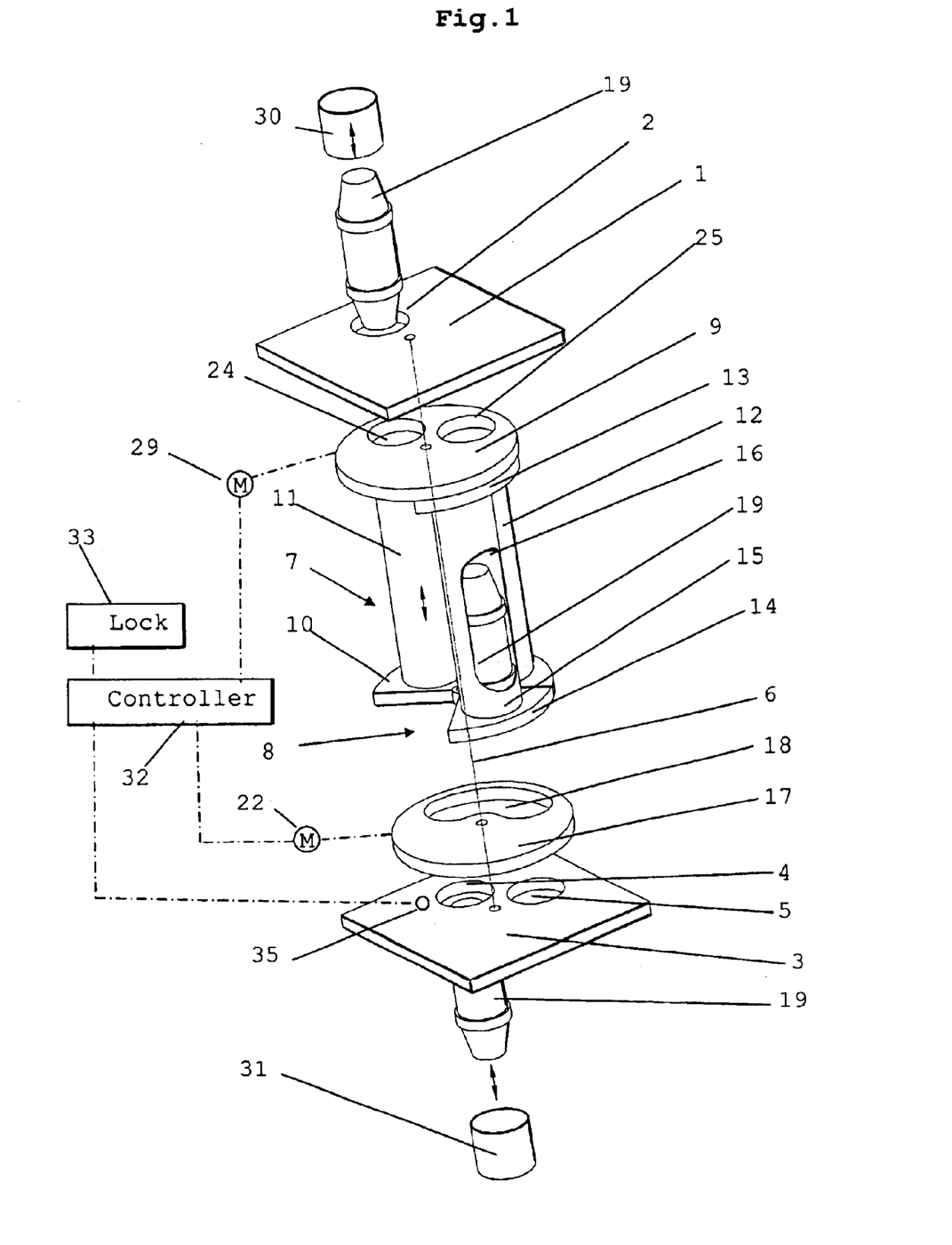
FIG. 1 is a partly diagrammatic exploded view of a portion of a pneumatic-tube conveyor according to the invention in the pass-through position.

As seen in FIG. 1 a terminal housing has a fixed upper plate or wall 1 formed with a hole 2 to which is attached a tube section 30 and a lower plate or wall 3 formed with a hole 4 aligned parallel to an axis 6 with the hole 2 and connected with another tube section 31. The wall 3 is formed offset by 90° relative to the axis 6 with a second outlet hole or port 5 that typically opens down into a basket not illustrated here.

Between the two walls 1 and 3 is a first rotor 7 that can be pivoted about the axis 6 by a motor 29 and that comprises and upper circular end plate 9 centered on the axis 6 and a lower semicircular end plate 10. The upper plate 9 is formed with two holes 24 and 25 angularly offset by 90° about the axis 6 and the lower plate 10 is formed with two identical holes that are not shown here and that are aligned axially with the holes 24 and 25. A pair of tubes 11 and 12 extend axially between the illustrated upper holes 24 and 256 and the unillustrated lower holes. The tube 11 is a smooth pass-through tube adapted to allow a passing carrier such as shown at 19 to pass axially in either direction through the rotor 7 and the tube 12 is set to brake and stop a passing carrier 19.

A second rotor 8 also pivotal about the axis 6 has upper and lower quarter-circular end plates 13 and 14 axially bridged by another tube 15 formed with a laterally open aperture or port 16. The housing including the plates 1 and 3 has an unillustrated side wall with a door that gives access to the aperture 16 for loading a carrier 19 into the system, either to send something out or to return an empty. The second rotor 8 does not have a drive of its own, but instead is shifted by being pushed or pulled angularly by the rotor 7 operated by the motor 29 and may be coupled to the rotor 7 by a solenoid for joint pivoting therewith.

Provided atop the plate 3 and underneath the coplanar plates 10 and 14 is a lock plate 17 pivotal about the axis 6 and provided with a kidney-shaped aperture or port 18 capable of overlying both ports 4 and 5 in an open position and also capable of blocking one or the other of the ports 4 and 5 in a blocking position. Another motor 22 operated by a controller 32 like the motor 29 serves to move this plate 17 between its positions. This plate 17 can be recessed in the plate 3 or even underneath it.

The system operates as follows:

In the FIG. 1 pass-through position, the tube 11 is aligned between the tube sections 30 and 31 so that a carrier 19 can pass straight through the terminal in either direction. At the same time a carrier 19 can be loaded laterally through the opening into the tube 15.

Figure 2:
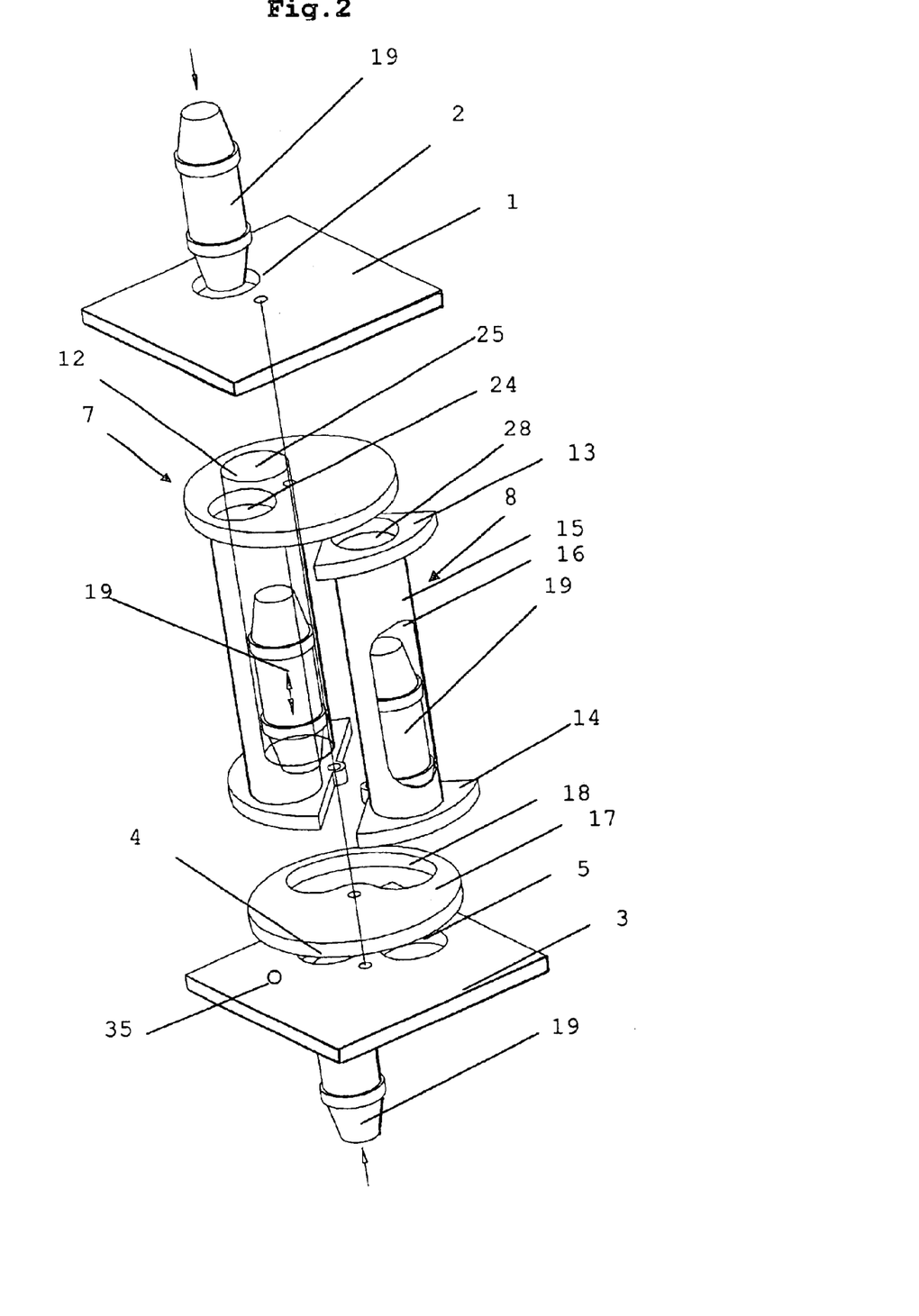
FIG. 2 is a view like FIG. 1 but with the system in the trapping/intercepting position.
Figure 3A:
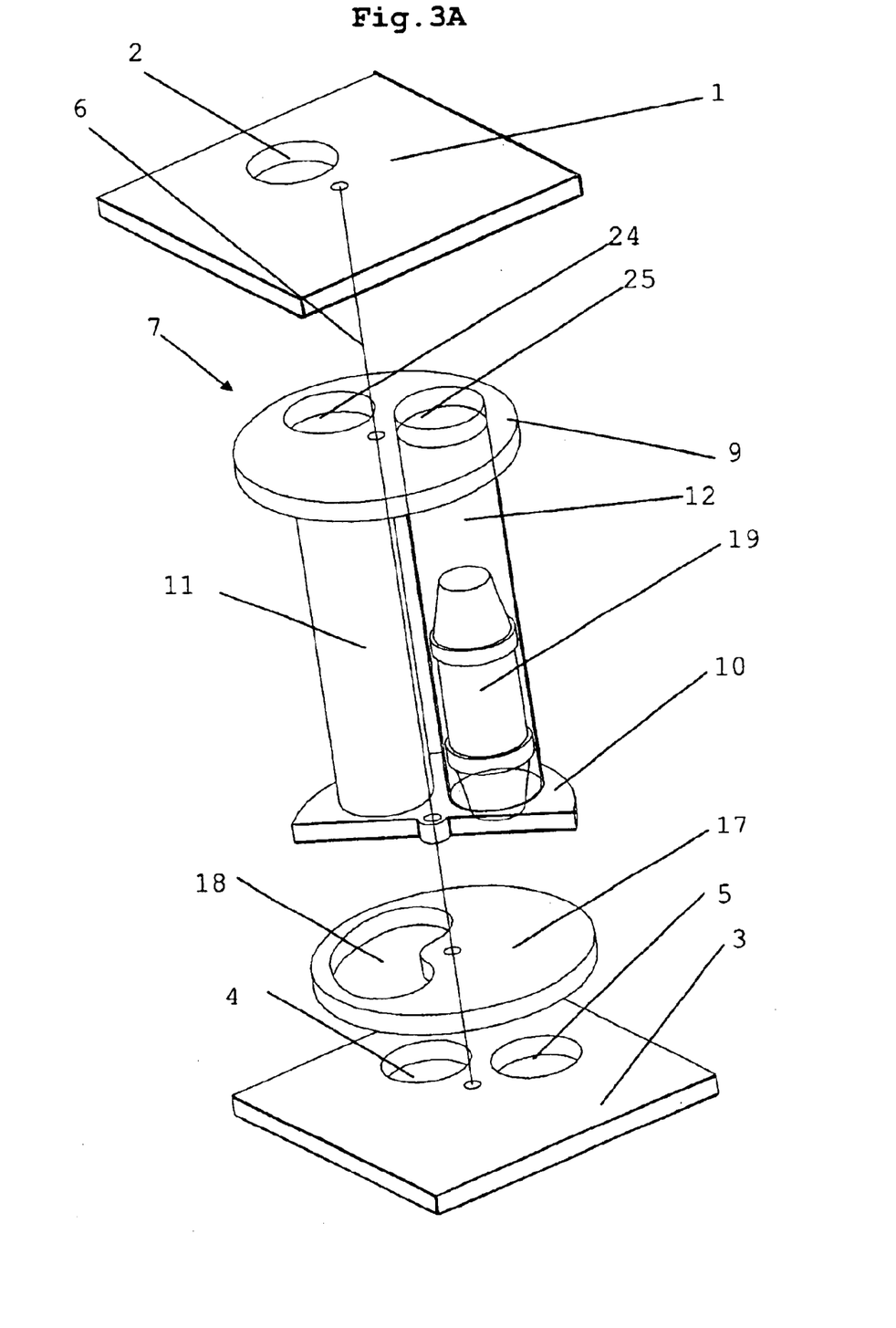
FIG. 3A is a view like FIG. 1 in the storing position.

To intercept and take a carrier 19 out of the system, the rotor 7 is moved by the motor 29 into the position of FIG. 2 with the braking tube 12 aligned between the tube sections 30 and 31. In this position the carrier 19 is stopped inside the tube 12. A sensor 35 on, for instance, the lower wall 3 reads the code on the carrier 19 that has been intercepted and determines whether it needs to be handled in a secure manner or not. Either way, the rotor 7 pivots through 90° after trapping the carrier 19 and aligns the tube 12 with the port 5 as shown in FIG. 3A. In each stopped position of the rotor 7 a locking solenoid or the like keeps it firmly in position.

If the carrier 19 that has been intercepted is nothing special, the plate 17 remains in the position of FIG. 2 with its port 18 overlying both holes 4 and 5 and the trapped carrier 19 falls down out of the terminal into the catch basket. On the other hand, if the intercepted carrier 19 must be handled in a secure manner, the plate 17 is pivoted as shown in FIG. 3A so that it blocks the port 5 and prevents the trapped carrier 19 from exiting the terminal. On movement between these end positions the aperture 18 leaves the pass-through port 4 open.

Figure 3B:
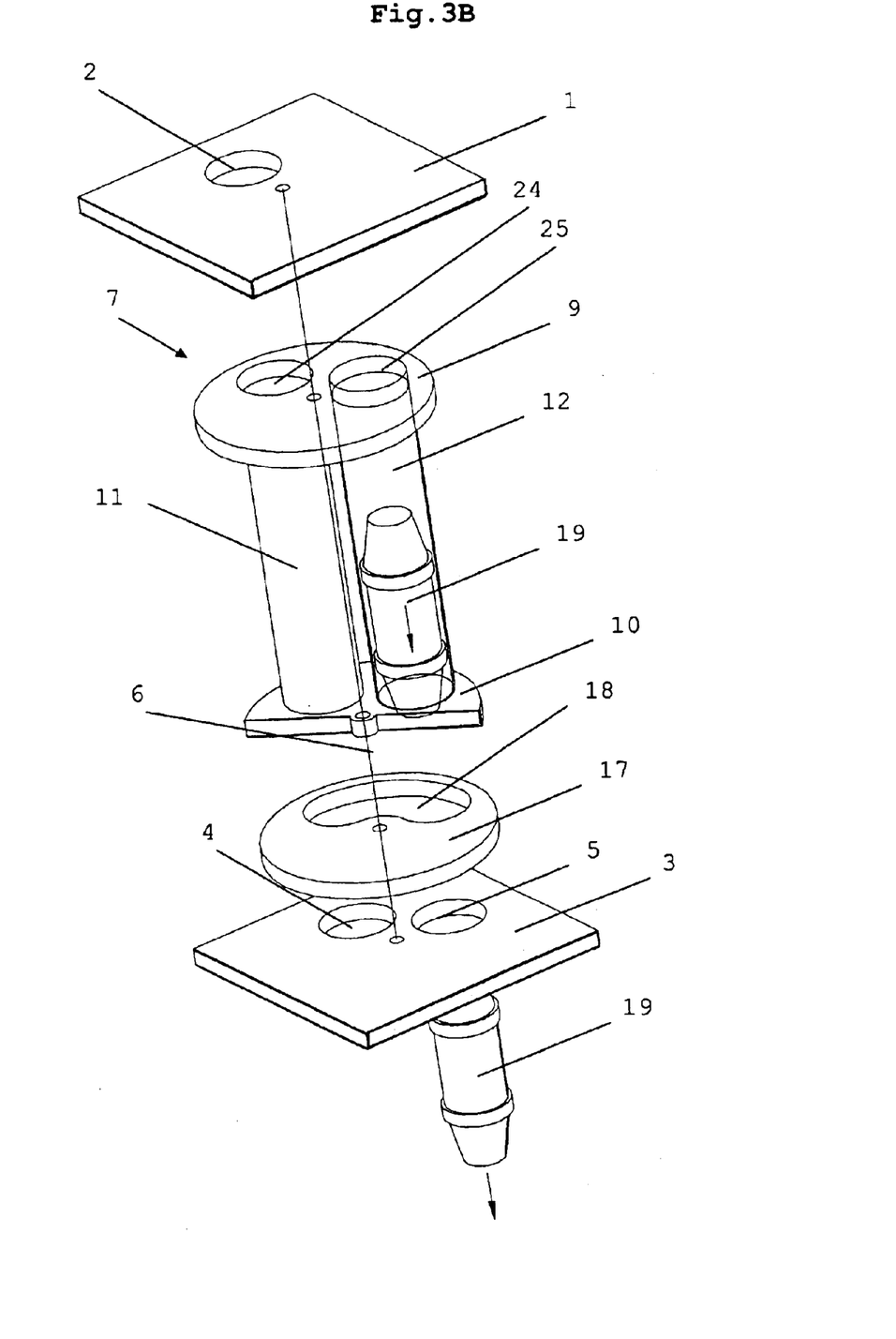
FIG. 3B is a view like FIG. 1 but in the releasing position.

Only when a lock 33, for instance operated by a code punched into a keypad or by a coded card or transponder, is actuated can the plate 17 be pivoted back into the freeing position as shown in FIG. 3B in which the carrier 19 can drop out of the terminal. The controller 32 normally incorporates a timer that monitors the state of the terminal and swings the rotor 7 into the FIG. 2 position and sends the carrier 19 back if it is not claimed within a certain time.

During the above operations, in which the rotor 7 moves only through 90°, the rotor 8 remains stationary, normally locked in place by a solenoid in one of the end walls 1 or 3. Thus it is possible at any time to load in a carrier 19 for return or dispatch. Also in both of these positions the lock plate 17 leaves the port 4 clear, so that in the storing position of FIG. 3A the terminal is not blocked, that is carriers 19 can pass through it.

Figure 3C:
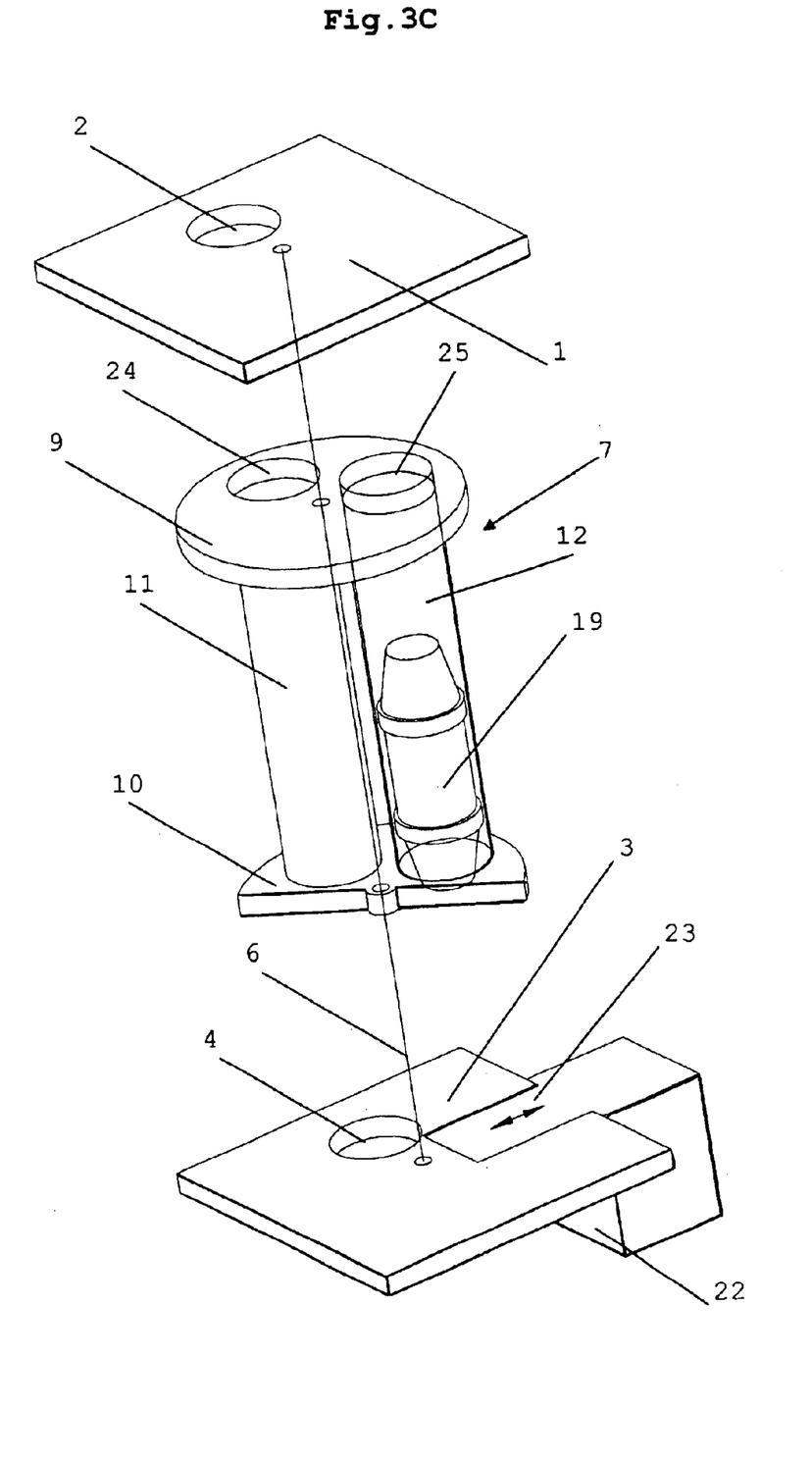
FIG. 3C is a view like FIG. 3A of an alternative arrangement.
Figure 3D:
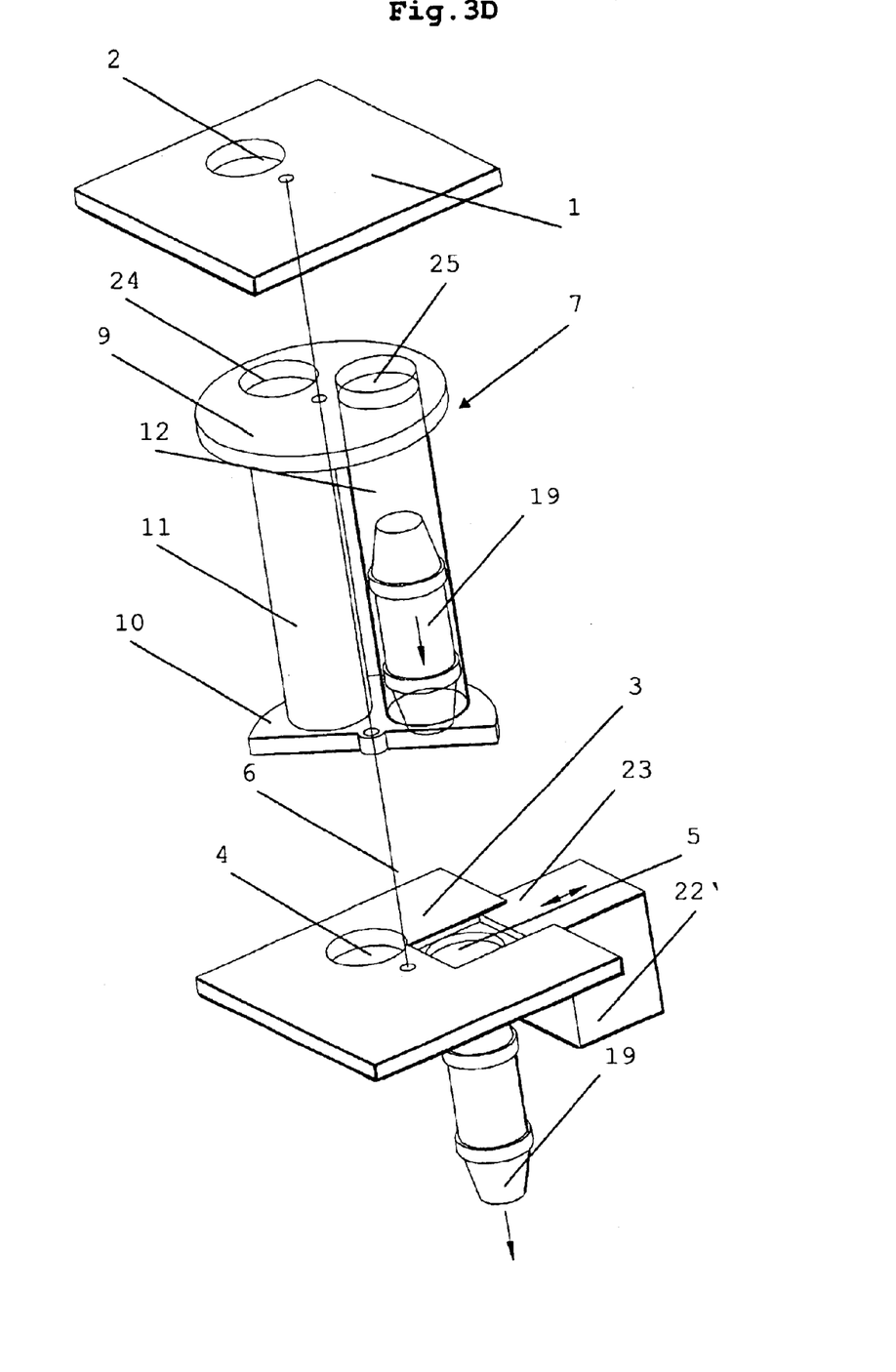
FIG. 3D is a view like FIG. 3B of the alternative arrangement.

The system of FIGS. 3C and 3D works similarly, but instead of pivoting the plate 17, a slide 23 is moved radially by an actuator 22'.

If a carrier 19 is loaded into the rotor 8 at any time for return or dispatch, it is sent off by coupling, for instance by means of a solenoid, the rotor 8 to the rotor 7 and then rotating the rotor 7 through 180° by means of the motor 29. This action aligns the tube 16 with the tube sections 30 and 31 and allows the carrier 19 held therein to be moved off in either direction. During such pivoting of the rotor 8, the plate 17 is also moved by its motor 22 to hold up the carrier 19, and it is only shifted out of the way when the tube 15 is aligned with the ports 2 and 4.

Figure 4:
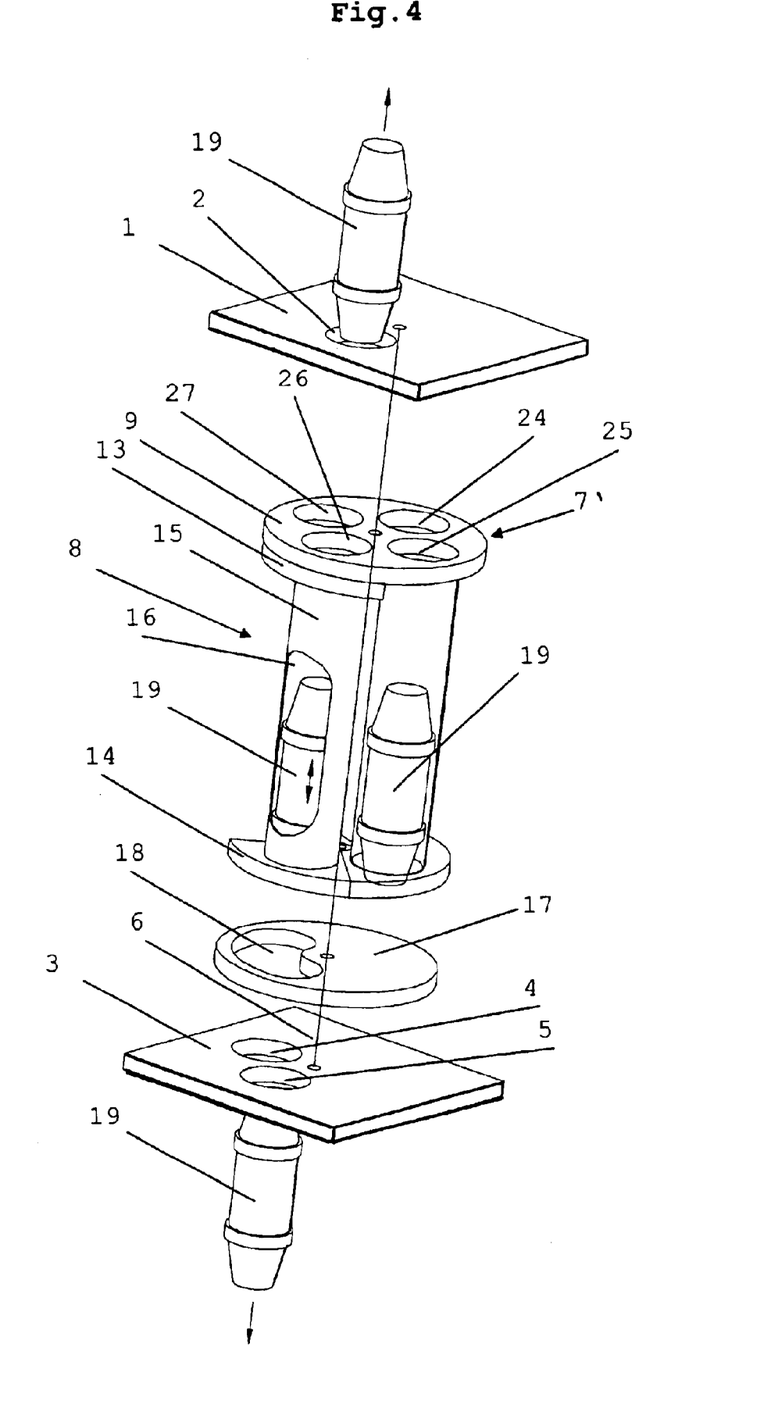
FIG. 4 is a view like FIG. 4 of yet another system in accordance with the invention.

In the arrangement of FIG. 4 the upper plate 9 of the rotor 7' has four angularly equispaced ports 24, 25, 26 and 27. This way the carrier 19 in the rotor 8 can be sent off upward as well as downward.

I claim:

1. A terminal for connection between sections of a pneumatic tube for passing and intercepting carriers passing along the tube, the terminal comprising:

upper and lower end walls spaced apart along an axis and having respective upper and lower ports respectively connected to the tube sections, the lower end wall also having angularly offset from the respective tube section an outlet port;

a rotor rotatable about the axis between the end walls between a pass-through position and an intercept position, the rotor having
   a pass-through tube aligned between the tube sections only in the pass-through position, and
   an intercept tube aligned between the tube sections only in the intercept position and aligned with the outlet port in the pass-through position, the intercept tube being adapted to brake and stop a carrier;

a closing plate under the rotor, having an axially throughgoing aperture, and displaceable between a closed position blocking the outlet port and with the aperture aligned with and permitting movement through the lower port and an open position with the aperture aligned with and permitting passage through both the lower and outlet ports; and user-specific locking means for displacing the closing plate into the open position.

2. The pneumatic-tube terminal defined in claim 1, further comprising a second rotor separate from the first-mentioned rotor and rotatable about the axis between the end walls between a loading position and a dispatch position, the second rotor having a loading tube with a lateral loading opening and aligned with the tube sections in the dispatch position and not aligned with the tube sections in the loading position.

3. The pneumatic-tube terminal defined in claim 1 wherein the closing plate is rotatable about the axis between the closed and open positions.

4. The pneumatic-tube terminal defined in claim 3 wherein the closing-plate aperture is angularly elongated.

5. The pneumatic-tube terminal defined in claim 1 wherein the closing plate is slidable generally radially of the axis between the closed and open positions.

* * * * *